July 23, 1929.    J. B. TWEET    1,721,650
HEN'S NEST
Filed Nov. 17, 1927
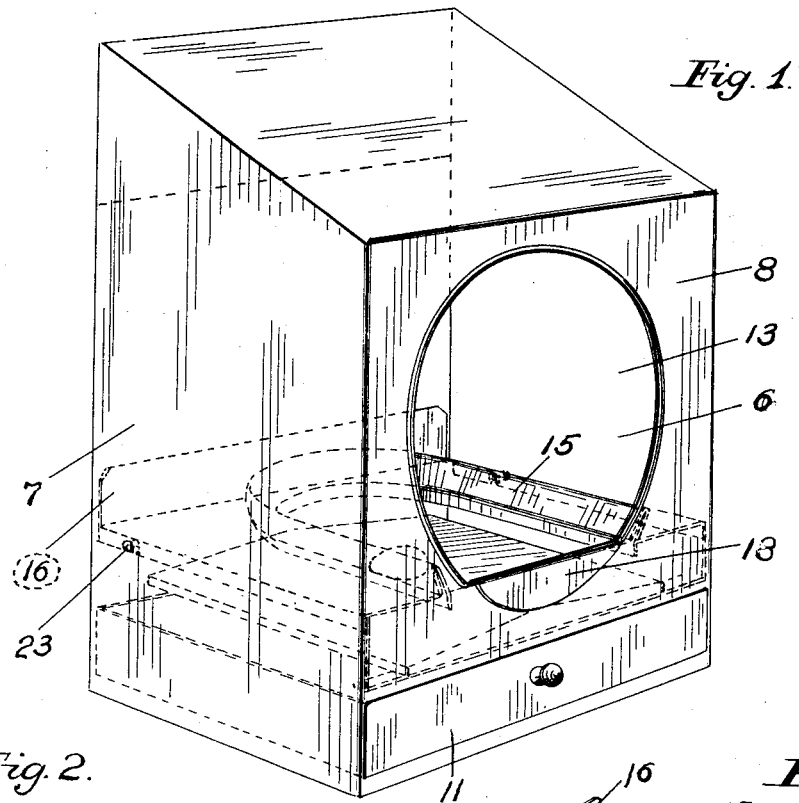
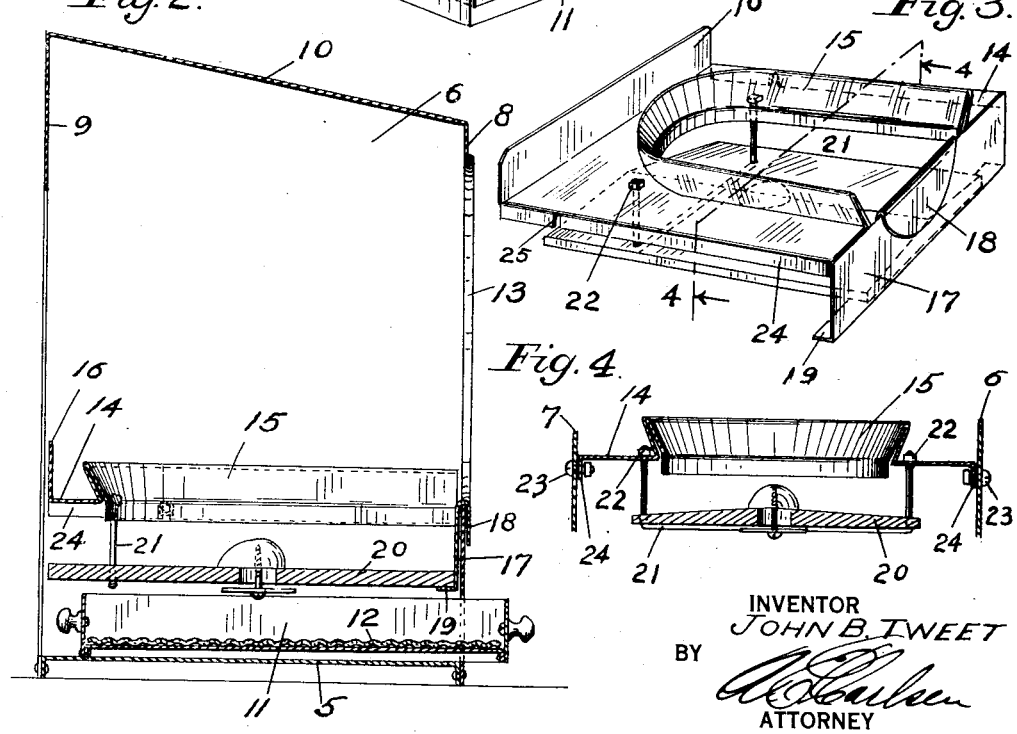
INVENTOR
JOHN B. TWEET
BY
ATTORNEY Patented July 23, 1929.

1,721,650

UNITED STATES PATENT OFFICE.

JOHN B. TWEET, OF FRANKLIN, MINNESOTA, ASSIGNOR OF ONE-FOURTH TO SEVAT HATLESTAD, OF MINNEAPOLIS, MINNESOTA, AND ONE-FOURTH TO EDWARD J. MIELKE, OF HAMBURG, MINNESOTA.

HEN'S NEST.

Application filed November 17, 1927. Serial No. 233,922.

This invention relates to poultry coop equipment, and the primary object is to provide a practical and efficient construction of hen's nest, that is so designed that it will not only be attractive to the hen but is so constructed that it will permit the hen's eggs to drop into a receptacle from which they may be removed, without disturbing the fowl which may at the time be setting in the nest. A further object is to provide a nest unit proper that may readily be inserted in or removed from a unit housing, for purpose of cleaning, and for the further reason that such nest units may be supplied to poultry keepers who may place them in housing which they may already have. In certain respects the present invention is quite similar to those disclosed in my copending applications for patents for hen's nests, Ser. No. 182,223, filed April 9, 1927, and Ser. No. 226,639, filed Oct. 17, 1927, although the instant case presents various improvements, over the structures disclosed in my said earlier applications.

In the accompanying drawing:

Fig. 1 is a perspective view of a hen's nest embodying my invention.

Fig. 2 is a sectional elevation taken on a central plane through the nest, from front to back.

Fig. 3 is a perspective view of the inner unit of the nest.

Fig. 4 is a detail sectional view through the nest, as seen on the line 4—4 in Fig. 3.

Referring to the drawing more particularly and by reference characters, 5 designates the bottom or floor of a housing having side walls 6 and 7, a front wall 8, a rear wall 9, and a cover 10. In the lower end of the housing is a drawer 11, that may be opened from either the front or rear, and when closed this drawer fits snugly between the side walls 6 and 7. This drawer receives the eggs that are dropped into it laterally from above, and is preferably provided with a corrugated mat 12 so as to cushion the fall of the eggs and prevent them from breaking.

The rear wall 9 may extend from top to bottom and be removable, or it may have a large opening, as shown in Fig. 2, so that the inner nest unit may be removed and replaced from the rear. Otherwise, the opening 13 in the front wall, and through which the hen enters, may be made large enough to permit the inner nest unit to pass through it.

The inner nest unit consists of a shelf plate 14 that extends in a general horseshoe shape about the sides and rear of the housing. This shelf has a U-shaped sloping guard 15, that preferably extends both below and above the shelf to form the side and rear guards of the nest proper, and impart to it a general bowl shape. The side portions of the guard 15 cooperate with the housing walls 6 and 7, and the shelf 14, to form channels, as shown in Fig. 4, in which hay or straw may be placed to give the housing interior a natural and attractive atmosphere for the hen. And, in a similar manner, an upstanding flange 16, at the rear end of the plate 14 forms a channel with the rear portion of the guard.

The front end of the shelf has a flange 17 that abuts the front wall 8, and this continues in an overhanging tongue 18, that is supported on the ledge forming the lower edge of the opening 13. The flange 17 is provided, at its lower edge, with a ledge 19 that supports the forward end of a platform 20. This platform forms the bottom of the nest to primarily support the hen, and is supported, at the rear, by a substantially V-shaped hanger 21, the upper ends of which are secured to the shelf 14 by nuts 22. The platform 20 preferably slopes to both sides so that the eggs will roll off and down into the tray 11, and is so spaced from the lower edge of the flange 15 that it will permit the eggs to roll under the flange. It will thus be seen that while the eggs may readily escape, the hen has a firm footing upon the platform, and as there are no visible or exposed trap holes or the like, the hen cannot become either frightened or injured.

The front end of the inner nest unit is supported, in a quickly releasable and removable manner, by the tongue 18. The rear end is supported by a pair of lugs, pins, or bolts 23, carried in the side walls 6 and 7. To more firmly hold the unit in place, the shelf 14 may have a pair of laterally disposed flanges 24 having notches 25 adapted to slip down over the inner ends of the members 23. It will thus be seen that it is not only a simple matter to remove the nest unit, for cleaning and repair purposes, but that it is a very simple matter to install the unit in a nest housing of the proper size.

It is understood that suitable modifications may be made in the general design and structural details of the invention as herein shown, provided, however, that said modifications come within the spirit and scope of the appended claims.

Having now therefore fully shown and described my invention, what I claim to be new and desire to protect by Letters Patent is:

1. A nest unit of the character described comprising a substantially U-shaped shelf plate having a sloping guard around its inner edge, a platform spaced below the plate so as to permit eggs to roll laterally off the platform under the guard.

2. A nest unit of the character described comprising a substantially U-shaped shelf plate having a sloping guard around its inner edge, a platform spaced below the plate so as to permit eggs to roll laterally off the platform under the guard, said plate having a depending member at its front end to support the front end of the platform, and a U-bolt for suspending the rear end of the platform from the shelf plate.

In testimony whereof I affix my signature.

JOHN B. TWEET.